May 23, 1944.　　　　M. J. MORGAN　　　　2,349,744
POWER TRANSMISSION UNIT
Filed Feb. 8, 1943　　　　3 Sheets-Sheet 1

Inventor:
MAURICE J. MORGAN
By
Eaton + Brown
Attys

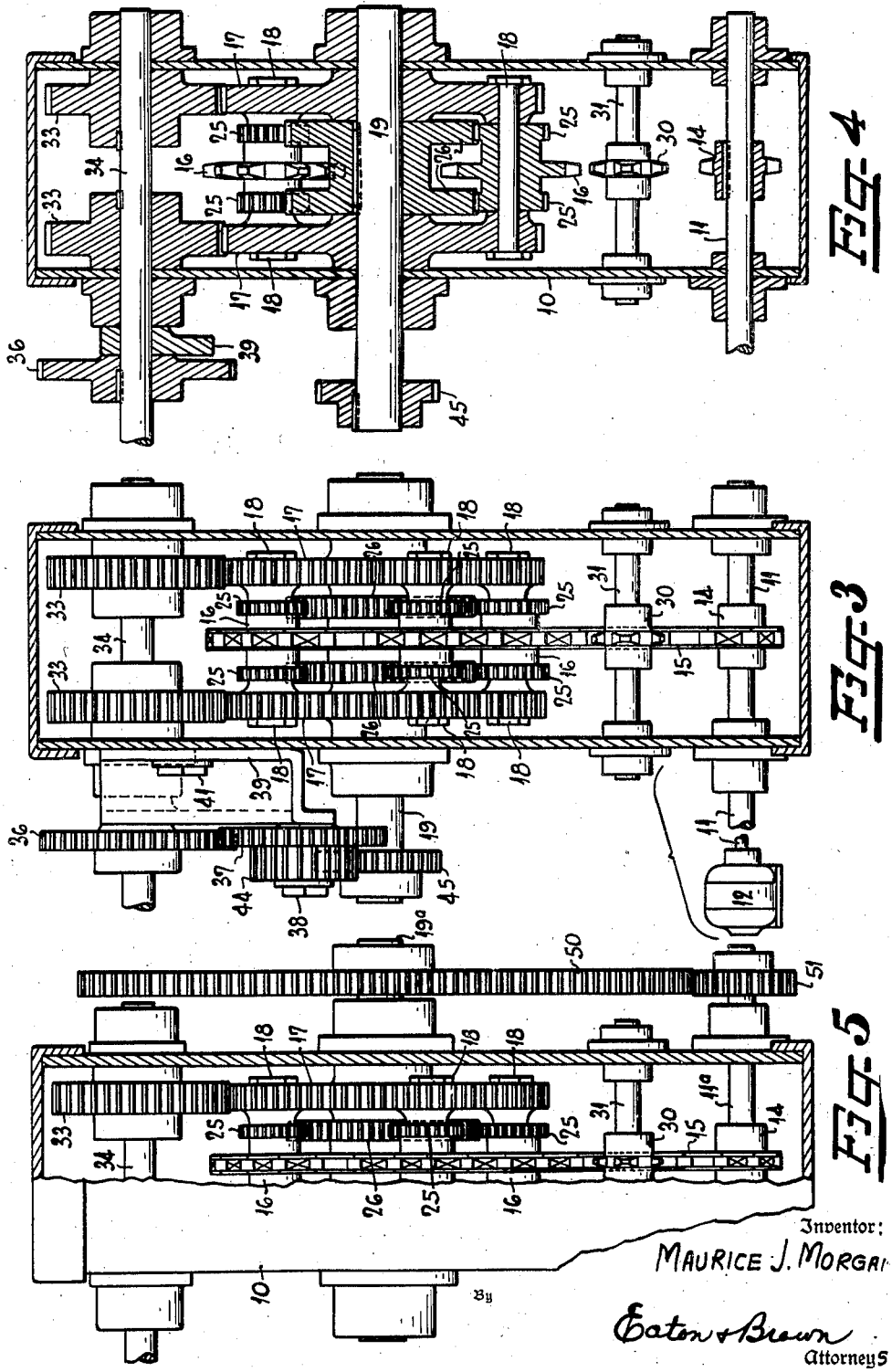

May 23, 1944.　　　　M. J. MORGAN　　　　2,349,744
POWER TRANSMISSION UNIT
Filed Feb. 8, 1943　　　　3 Sheets-Sheet 3
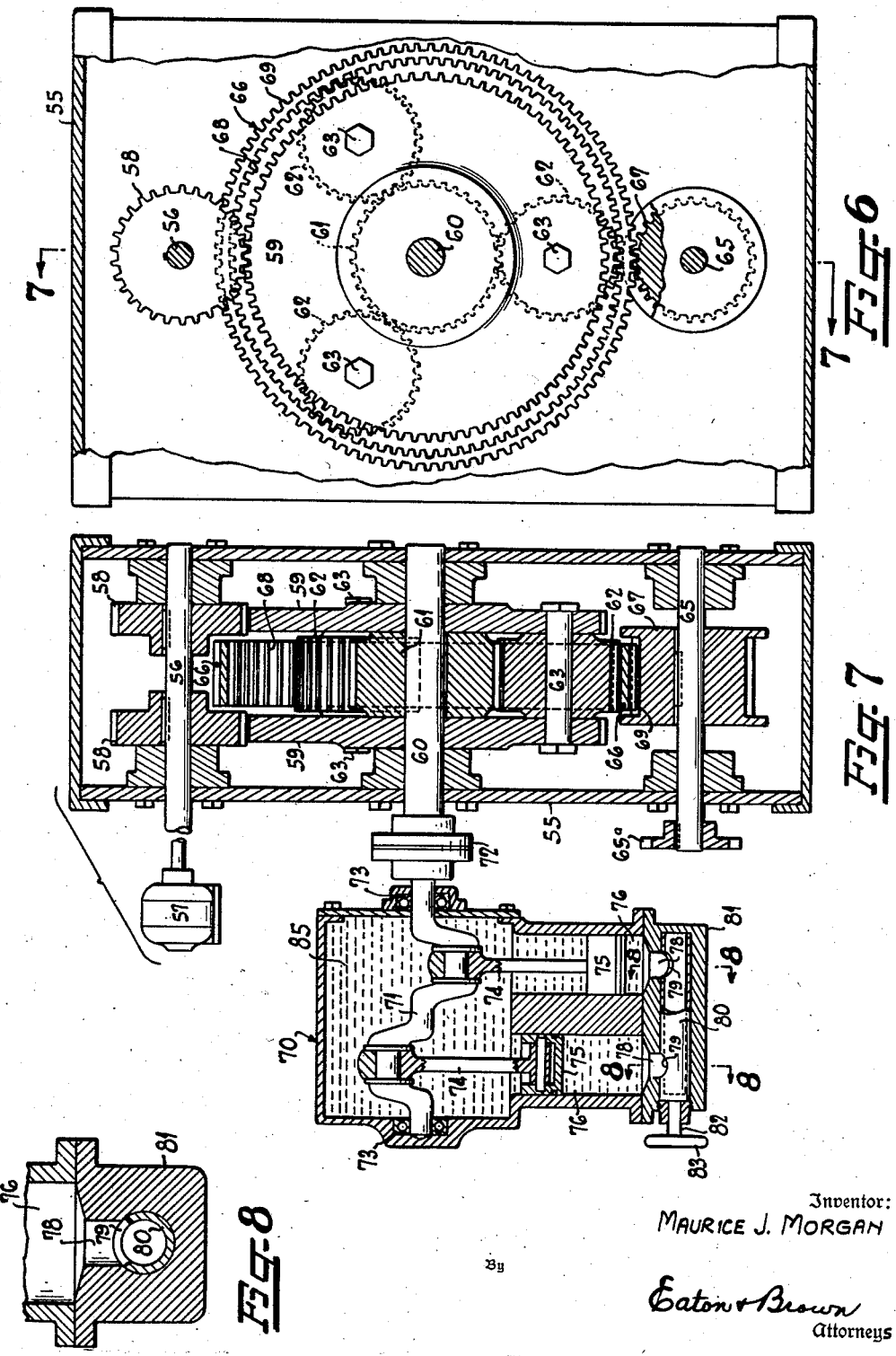
Inventor:
MAURICE J. MORGAN
By
Eaton + Brown
Attorneys Patented May 23, 1944

2,349,744

UNITED STATES PATENT OFFICE 2,349,744

POWER TRANSMISSION UNIT

Maurice J. Morgan, Charlotte, N. C.

Application February 8, 1943, Serial No. 475,127

7 Claims. (Cl. 74—301)

This invention relates to a power transmission unit, and more especially to an improvement in an apparatus such as disclosed in my Patent No. 2,299,247, issued October 20, 1942.

It is an object of this invention to provide a transmission unit of the class described which is capable of reducing or increasing the speed of a machine to be driven, quickly and effectively with a minimum amount of friction loss.

It is another object of this invention to provide a power transmission unit capable of such reduction that the speed of the driven shaft may be reduced to zero, or even have its direction of rotation reversed without changing the direction of rotation of the driving means such as an electric motor. When using the present invention, motor speeds such as 3500 R. P. M.'s or 1750 R. P. M.'s are simply and effectively reduced to any desired speed in the driven shaft by merely changing the ratio of one or two easily accessible gears, or by applying a suitable brake to one of the shafts.

It is yet another object of this invention to provide a power transmission unit wherein the speed of the driven shaft may be incrementally varied from zero R. P. M.'s to its maximum speed thereby smoothly and effectively picking up the load of the driven shaft and increasing it to the top speed, thus preventing the overloading of the motor. In other words, many types of machinery are so constructed that it is necessary to gradually increase the speed from zero to the normal operating speed. This unit provides such a means coupled with a maximum conservation of power. The present invention reduces friction in the power transmission to a minimum because the variation of speed of the transmission is controlled by a synchronization of two separate applications of power from the same source.

Some of the objects of the invention having been stated, other objects will appear as the description proceeds when taken in connection with the accompanying drawings, in which:

Figure 3 is a vertical longitudinal sectional view taken along the line 3—3 in Figures 1 and 2;

Figure 4 is a vertical longitudinal sectional view taken along the line 4—4 in Figures 1 and 2 with certain portions thereof omitted such as the driving chain for the sprockets;

Figure 5 is a sectional view similar in many respects to Figure 3, but showing a slightly modified form of speed variation means;

Figure 6 is a sectional view illustrating still another modified form of the invention;

Figure 7 is a vertical longitudinal sectional view taken along the line 7—7 in Figure 6;

Figure 8 is a transverse sectional view taken along the lines 8—8 in Figure 7.

Figure 2:
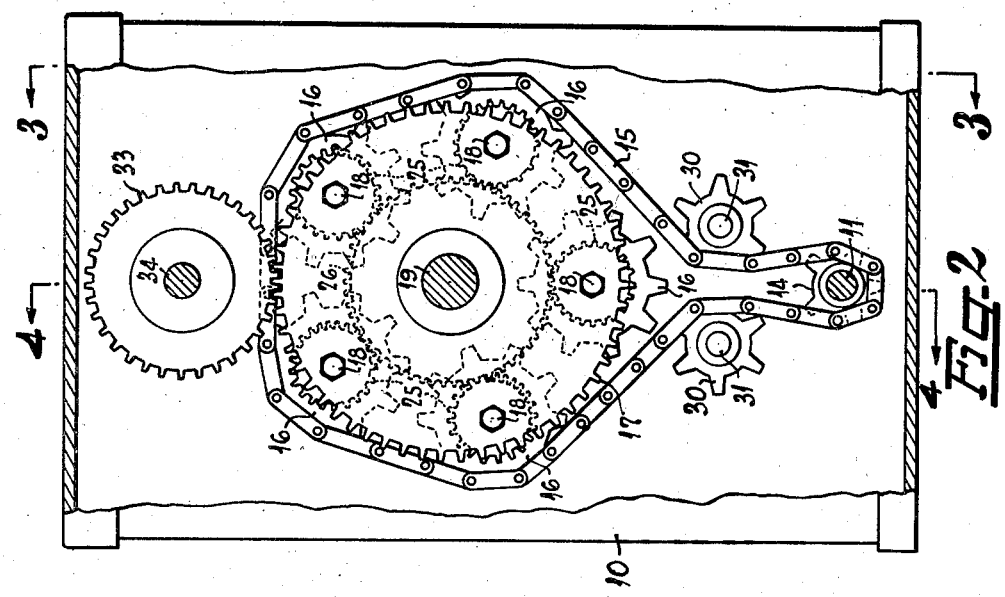
Figure 2 is a sectional view similar to Figure 1, but having portions of the housing broken away so as to illustrate the mechanism on the interior thereof.

Referring more particularly to the drawings, the numeral 10 denotes a suitable housing in which various elements of the present transmission device are located. A shaft 11 is rotatably mounted in the sidewalls of housing 10, said shaft being driven by any suitable source of power such as an electric motor 12. (See Figure 3.) Fixedly secured upon the shaft 11 and within the housing 10 is a pulley or sprocket 14, and upon this sprocket is mounted a suitable flexible driving means such as a sprocket chain 15. The sprocket chain is also mounted upon a plurality of other pulleys or sprockets 16, which, in turn, are rotatably secured between a pair of spaced disks 17 upon bolts 18. It can be seen by referring to Figure 4 that the spaced disks 17 are rotatably mounted around a shaft 19, which shaft is rotatably mounted in the side walls of housing 10. Also, the sprocket bolts 18 are arranged in a circle on disks 17, the center of said circle being the center of shaft 19. These sprockets have the same diameter, and are equally spaced apart from each other around said circle. In such an arrangement, the rotation of drive shaft 11 will impart rotation to the sprockets 16 through the medium of chain 15. For example, if the disks 17 should be held stationary or in a non-rotating position, the axes of the sprockets 16 would be held in a stationary position, but the sprockets would be permitted to rotate about their individual axes 18 due to the movement of chain 15. In the present disclosure, however, it is rarely the case that the disks 17 are permitted to remain stationary for any appreciable length of time during operation, as will be seen when a further description of the operating parts has been made.

Each of the sprockets 16 has integral therewith a pair of pinions 25, said pinions being adapted to mesh with a pair of gears 26 fixedly secured upon rotatably mounted shaft 19. The arrangement of the pinions 25 relative to shaft 19 is substantially the same as the arrangement of the sprockets 16 to this same shaft, namely the centers of the pinions 25 are the same as the centers of sprockets 16. Likewise, the diameter of the pinions 25 are the same, so that each of the pinions will mesh with a gear 26 at all times. Therefore, it is seen that when sprockets 16 are rotated about their individual axes, due to the movement of driving elements 11 and 15, a bodily rotative movement of all of the sprockets 16 and associated pinions 25 will be produced about the shaft 19 as an axis. If the shaft 19 and the associated gears 26 are held in a stationary position, then the rate of bodily rotation of the pinions 25 and sprockets 16 about the shaft 19 will be at a maximum, whereas if a simultaneous rotative movement is permitted by shaft 19, then the bodily rotation of elements 16 and 25 will be reduced or increased accordingly, dependent upon the direction of rotation of shaft 19.

In the drawings, it will be observed that suitable idler sprockets 30 are fixedly secured upon rotating shafts 31, which, in turn, are rotatably mounted in housing 10. The sprockets 30 are employed for confining the chain or driving member 15 in close proximity to the outermost teeth of sprockets 16 at all times. In other words, by confining the chain 16 is close proximity to the outermost teeth of the several sprockets 16 as shown in Figure 2, vibration of the chain 15 caused by the flat lengths of the chain between the rotating sprockets 16 is eliminated. These idlers are set as close as possible to the overall periphery of the chain 15 which is disposed around the several sprockets 16, and therefore, the slack in the chain 15 will be substantially the same regardless of the position occupied by the sprockets 16 as they bodily rotate about shaft 19.

As previously described, the side disks or elements 17 serve as a spider for supporting the sprockets 16 as well as pinions 25. These disks also serve as a means for transmitting power from the parts 16 to 26 just described to a driven shaft such as designated by the reference character 34. The power transmitting means in the present case to the drive shaft 34 is a geared connection; however, other means may be employed such as by cutting gear teeth in some other diameter of the disks 17, and permitting these gear teeth to engage a suitable fixed gear on the driven shaft 34. If desired, a chain connection could be provided between the disks 17 and the shaft 34, or yet still another transmitting means could be employed such as a grooved pulley and belt connection. In the present case, teeth are cut in the periphery of disk 17 and these teeth mesh with suitable gears 33, which are fixedly secured upon driven shaft 34. Shaft 34 is rotatably mounted in the side walls of housing 10, and has fixedly mounted upon one of its projecting end portions a gear 36, said gear meshing with another gear 37 rotatably mounted as at 38 upon a bracket plate 39. This bracket plate 39 is bodily rotatable about shaft 34 as an axis (see Figure 1) and may be adjusted in a number of radial positions. The adjusting means comprises a slot 40 in plate 39, which is penetrated by a stud bolt 41 threadably secured in the housing 10. One face of the gear 37 has removably secured thereto as at 43 a change gear 44, said change gear being adapted to mesh with a gear 45 fixedly secured upon rotating shaft 19.

Figure 1:
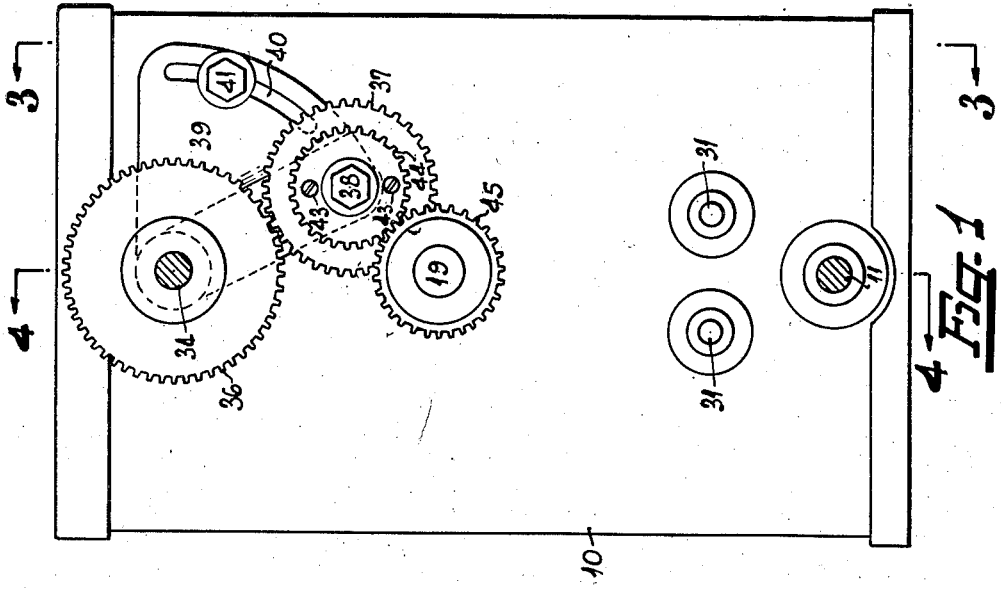
Figure 1 is an end elevation of my improved transmission power unit with certain portions thereof shown in section.

The geared connection shown in Figure 1 and designated by reference characters 36, 37, 44 and 45 constitutes a positive control between the driven shaft 34 and the rotating shaft 19. As previously stated, when the shaft 19 is held in stationary position, the speed of the output shaft as well as the speed of the disks 17, gears 33, and output shaft 34 is at a maximum, whereas if the shaft 19 is permitted to rotate, the speed of the shaft 34 will be reduced accordingly as long as the gears 36, 37, 44, and 45 cause the shaft 19 and gears 26 to rotate in the same direction as the pinions 25 bodily rotate about this same shaft; however, when the chain of gears 36, 37, 44 and 45 is such that gear 26 and shaft 19 will rotate faster than the bodily rotation of pinions 25, the direction of rotation of the driven shaft 34 will be reversed. The geared connection comprising members 36, 37, 44, and 45 therefore positively controls the rate of rotation of shaft 19 and gears 26, which rate of rotation positively controls the speed and direction of rotation of driven shaft 34. If it is desired to vary the output speed, it is only necessary to loosen the stud bolt 41 and then replace the change gear 44 with a gear of the desired diameter. Then the bracket 39 carrying the substituted gear is adjusted so that the proper mesh will be effected with the gear 45. It is therefore seen that a very simple arrangement is provided whereby the rate and direction of rotation of the driven shaft 34 may be varied with a minimum amount of labor.

It is further seen that unless the rotation of shaft 19 and associated gears 26 is retarded or controlled while the radially disposed sprockets 16 and the associated pinions 25 are bodily turned, all the power will be dissipated through the rotating shaft 19. As one stops or retards the speed and direction of the rotation of shaft 19, the disks 17 rotate faster, thereby imparting power to the driven shaft 34.

Figure 5 illustrates a slightly modified form of control means for varying the rate of rotation of the driven shaft 34. In this form of the invention, the shaft 19 is replaced by a similar shaft 19a, and upon one end of this shaft 19a a large gear 50 is fixedly secured, said gear 50 being adapted to mesh with a smaller gear 51 disposed upon a drive shaft 11a. Drive shaft 11a is used to replace the shaft 11 previously described. By employing this geared connection, the shaft 19a is positively rotated very much in the same manner as the shaft 19 is rotated in the first form of the invention through the medium of gears 36, 37, 44 and 45. This latter form of the invention, as shown in Figure 5, is disclosed merely to show that the source from which the shaft 19 or 19a is rotated does not matter as long as the rotation of these shafts is synchronized with the rotation of the driving means, such as the electric motor 12.

Figures 6, 7, and 8 show another modified form of the invention in which the gear reducing mechanism is different in construction and also in which means are provided for producing incremental variation in the rate of rotation of the driven shaft. In this form of the invention, a suitable housing 55 is provided for a number of elements of the gear reducing mechanism. A shaft 56 is rotatably mounted in the side walls of this housing, said shaft extending to the exterior of the housing and being connected to suitable source of power such as an electric motor 57. Gears 58 are fixedly secured upon shaft 56, which gears mesh with teeth in the periphery of disks 59, which disks are, in turn, rotatably mounted upon a shaft 60. Shaft 60 is rotatably mounted in the sidewalls of housing 55 and has fixedly secured on the intermediate portion thereof a gear 61. This gear 61 meshes with three other gears 62, which gears 62 are arranged in a circle between disks 59 and are each rotatably mounted upon an axis 63 for rotation.

Gears 62 are also bodily rotatable about shaft 60 as an axis. While three gears 62 are shown in the drawings, it is evident that any number may be employed as long as the same gear reducing principle is employed.

If the shaft 60 and gear 61 are permitted to remain stationary, the rotation of pinions 58 will produce a maximum rate of rotation of disks 59, at which time, the pinions or gears 62 will rotate both about their individual axes 63, as well as bodily about shaft 60. The rotation of the disks 59 and gears 62 is transmitted to a shaft 65 by means of a toothed ring 66, and a flanged gear 67. (See Figure 6.) This ring 66 has internal gear teeth 68 which mesh with the outer teeth in the three gears 62. Gear ring 66 also has external gear teeth 69 which mesh with the teeth in gear 67.

When the shaft 60 and the gear 61 are held in a stationary position, the rate of rotation imparted to the disks 59 by the driving gears 58 will be at a maximum speed. At the same time, the pinions 62 will bodily rotate about shaft 60 as an axis along with disks 59 as well as individually rotate about their shaft 63, as an axis. This rotation of the gears 62 will produce rotation of the ring 66 to cause the rotation of gear 67 and shaft 65. The shaft 65 extends to the exterior of housing 55 and has fixedly secured on the projecting end thereof a suitable power take-off member such as a sprocket 65a. When the shaft 60 and gear 61 are permitted to rotate the power supplied by shaft 56 will be dissipated in accordance with the rate of rotation of members 60 and 61, and consequently, the rate of rotation of driven shaft 65 will be correspondingly reduced.

As a means for controlling the rate of rotation of shaft 60 and its associated gear 61, a suitable oil brake broadly designated by reference character 70 is employed. This oil brake is connected directly to the projecting end of shaft 60, and serves as a retarder for this shaft to thereby vary the rate of rotation of the output shaft 65 and its associated sprocket 65a. For example, when certain machines to be driven by this unit from sprocket 69 are first started in operation, it is necessary for the rate of rotation to gradually build up from zero R. P. M.'s to normal speed. Therefore, means are provided whereby the shaft 60 and its associated gear 61 will be permitted to rotate at its maximum speed when the machine is first started to thereby dissipate the speed of motor 67, and reduce the speed of the take-off shaft 65 accordingly. After the inertia of the machine to be driven has been overcome, the rate of rotation of shaft 60 is gradually slowed down and the speed of take-off shaft 65 increased until the machine operates at the desired speed. If desired to operate the machine at a maximum speed, then the shaft 60 will be completely stopped and held in a stationary or non-rotating position.

The oil brake 70 comprises a crank shaft 71, one end of which is secured to shaft 60 by a coupling 72. This crank shaft is rotatably mounted in bearings 73 of the braking unit 70. Connected to crank shaft 71 is a pair of connecting rods 74, each of said rods having a piston 75 pivotally secured to the lower end thereof, and these pistons each reciprocate in a cylinder 76. In the present disclosure, the cranks driving the pistons 75 are located 180° apart on the crank shaft 75, and therefore when one piston 75 is in uppermost position, the other piston will be in lowermost position.

Communicating with the lower portion of each cylinder is a bore 78, which bores also communicate at times with bores 79 in a transversely disposed hollow pipe 80, said pipe being axially rotatable in a block 81 secured to a lower portion of the oil brake unit. A stem 82 is secured to one end of the hollow pipe 80. This stem has a suitable handle 83 on the projecting end thereof whereby the pipe may be axially rotated to cause the holes or openings 78 in the pipe to coincide with the openings 78 thereabove, or the pipe may be rotated to a position where these openings will be partially or completely closed to restrict or to cut off communication between the lower portion of cylinders 76. A supply of oil 85 is provided within the oil brake unit 70, said oil being disposed above the pistons as well as below.

It will be noted that the oil brake is employed for creating a retarding effect upon the control shaft while the transmission is picking up speed. As the transmission and the driven machine increases in speed, the flow of oil from one cylinder to the other gradually decreases. When maximum speed of the driven machine is reached, the flow of oil is completely stopped and the control shaft is stationary.

When the openings 79 completely coincide with the openings 78, communication is established between the two cylinders 76, and therefore, the crank shaft will be permitted to rotate and cause the oil on the lower sides of the pistons to be shuttled back and forth from one cylinder to the other by way of ports 78 and 79 and the interior of pipe 80. When it is desired to retard the rotation of the crank shaft 70, it is only necessary to rotate the pipe 80 accordingly, so that the passageways 78 between the lower portions of the cylinders 76 and the interior of pipe 80 will be restricted. Of course, when it is desired to completely stop the rotation of shaft 71, it will be necessary to rotate the pipe 80 to a position where the passageways 78 will be completely closed.

It is therefore seen that an incremental variation can be produced in the rate of rotation of shaft 71 by merely turning the hand wheel 83 and the associated pipe 80. Of course, when the rate of rotation of the crank shaft 71 and the shaft 60 is decreased, the corresponding increase in the rate of rotation of the output shaft 65 will be produced.

*Operation of form shown in Figures 1 to 4 inclusive*

In describing more fully the use of the chain of gears 36, 37, 44 and 45 in Figure 3, let us assume motor shaft 11 turns 1000 R. P. M.; that the load or machine to be driven is on shaft 34; that sprocket 14 is one inch in diameter; sprockets 16 are two inches in diameter; that gears 25 are one inch in diameter; that gears 26 are three inches in diameter; that gear elements 17 are five inches in diameter; that gears 33 are five inches in diameter; that gear 36 is five inches in diameter; that gear 37 is one inch in diameter; that change gear 44 is four inches in diameter, and that gear 45 is one inch in diameter. This gives us a ratio of twenty to one between gears 45 and 36.

It will be noted that the speed of elements 17 is controlled by the speed and the direction of rotation of gears 26 on shaft 19. With shaft 19 and gears 26 in a fixed position, there is a ratio of twelve to one between sprocket 14 and gears 17.

With gear 44 out of mesh with gear 45 and shaft 19 in a fixed position, we would therefore have a speed of eighty-three and one-third R. P. M. in gears 17, gears 33, and output shaft 34.

By causing gear 44 to mesh with gear 45, a speed ratio of twenty to one is produced between shafts 19 and 34. Shaft 19 and gear 26 revolves in the same direction as gears 36 and 33, but in a reverse direction to gears 17, 25 and sprockets 16. This reverse action of gear 25 decreases the speed of gears 17 as it increases the revolutions of gears 25 and sprockets 16 per revolution of gears 17. In this example gears 25 and sprockets 16 would turn sixty revolutions on their own axis per revolution of gears 17, which is an equivalent of sixty revolutions of sprockets 16, plus overall periphery of sprockets 16 which is six inches, making a total of one hundred and twenty-six to one between sprocket 14 and gears 17. The resultant speed of gears 17, gears 33 and output shaft 34 would therefore be one hundred and twenty-six to one or eight R. P. M.

*Operation for form shown in Figures 6, 7 and 8*

In describing more fully the use of a brakage means on shaft 60 (Figure 7) let use assume that gears 58 are three inches in diameter; that gears 59 are nine inches; that gears 62 are three inches; that gear 61 is three inches; that the inside diameter of gear band 66 on teeth 68 is nine inches; and that the diameter of external gear teeth 69 of gear band 66 is ten inches. Let us assume further that shaft 60 and gear 61 are held in a fixed position by the oil brake previously described, and that the machine to be driven is on shaft 65.

As power is applied by means of motor 57 through shaft 56 and gears 58 at the rate of 1000 R. P. M., gears 58 are caused to rotate 1000 R. P. M. and gears 59 are caused to rotate 333 R. P. M. around their axis 60. Gears 62 thereby rotate bodily around gear 61 on their individual axes 63. The rotation of gears 62 causes gear band 66 to rotate, said gears 62 being in mesh with teeth 68.

The linear speed or gear band 66 is therefore one and one-third times greater than gears 59, which is the equivalent to the overall periphery of gears 62 and one revolution of gears 62 on their own axes 63. Gear band 66 therefore has a linear speed of 444 R. P. M., and external teeth 69 therefore drive gear 67 and shaft 65 1480 R. P. M., which is the maximum speed possible using the brakage device.

It can be seen that this speed is only possible because of the retarding action between gears 62 and gear 61, and that if the brake is released and gear 61 is allowed to turn, the retarding action is lessened and the resultant speed of gear band 66 and gear 67 is reduced. The speed is therefore dissipated through gear 61, shaft 60, and the brake.

As the brake is completely released and all retarding action between gears 62 and gear 61 ceases, all speed is dissipated through the brakage device. Then gear band 66, gear 67, and output shaft 65 lose all momentum. It can therefore be seen how any speed is possible at the output shaft 65 from zero to 1480 R. P. M. by use of a braking device on shaft 60.

In the drawings and specification, there has been set forth a preferred embodiment of the invention, and although specific terms are employed, they are used in a generic and descriptive sense only and not for purposes of limitation, the scope of the invention being defined in the claims.

I claim:

1. A power transmission unit comprising a rotary shaft having a gear fixedly mounted thereon, a pair of disks rotatably mounted on said shaft, one of said disks being disposed on one side of said gear and the other of said disks being disposed on the opposite side, a plurality of sprockets rotatably mounted between said disks and being operatively connected to said gear, a driving means adapted to simultaneously engage at all times the outer peripheries of at least two adjacent sprockets as the disks rotate whereby each of the sprockets will rotate bodily about said shaft and also about its own axis when the disks rotate relative to said gear, and means for rotating said shaft and its associated gear in timed relation to the movement of said driving means for said sprockets, whereby the increase in the rate of rotation of said shaft and associated gear will decrease the rate of rotation of said disks.

2. A power transmission unit comprising a rotary shaft having a gear fixedly mounted thereon, a pair of disks rotatably mounted on said shaft, one of said disks being disposed on one side of said gear and the other of said disks being disposed on the opposite side, a plurality of rotary driving units mounted between said disks and being operatively connected to said gear, a driving means adapted to simultaneously engage at all times the peripheries of at least two adjacent rotary driving units as the disks rotate, whereby each of the rotary driving units will rotate bodily about said shaft and also about its own axis when the disks rotate relative to said gear, and means for rotating said shaft and its associated gear to thereby control the rate of rotation of said disks.

3. In combination, a rotary shaft, a disk fixed on said shaft, a second disk rotatably mounted on said shaft, and a plurality of rotary driving units arranged in a circle on said second disk, said units operatively engaging said first disk whereby each of the units will rotate bodily about the first shaft and also about its own axis when the second disk rotates, relative to said first disk, a driving means adapted to operatively engage at all times at least two of said units as the second disk rotates, and means for rotating said shaft and its associated disk to thereby control the rate of rotation of said second disk.

4. A power transmission unit comprising a rotary shaft having a gear fixedly mounted thereon, a pair of disks rotatably mounted on said shaft, one of said disks being disposed on one side of said gear and the other of said disks being disposed on the opposite side, a plurality of rotary driving units mounted between said disks and being operatively connected to said gear, a driving means adapted to simultaneously engage at all times the outer peripheries of at least two adjacent rotary driving units as the disks rotate whereby each of the rotary driving units will rotate bodily about said shaft and also about its own axis when the disks rotate relative to said gear, means for rotating said shaft and its associated gear to thereby control the rate of rotation of said disks, and means for varying the rate of rotation of said shaft to thereby vary the rate of rotation of said disks.

5. In combination, a rotary shaft, a disk fixed on said shaft, a second disk rotatably mounted on said shaft, and a plurality of rotary driving units arranged in a circle on one of said disks, said units operatively engaging said other disk whereby each of the units will rotate bodily about the first shaft and also about its own axis when the second disk rotates relative to the first disk, a driving means adapted to operatively engage at all times at least two of said units as the units and associated disk rotate, and means for varying the rate of rotation of said shaft to thereby vary the rate of rotation of said second disks.

6. In a power transmission unit the combination of a drive shaft, a driven shaft and a control shaft, a disk rotatably mounted upon said control shaft, a second disk fixedly secured upon said control shaft, a plurality of rotary driving units arranged in a circle upon one of said disks, and being operatively connected to said other disk, a driving connection between said drive shaft and said rotary driving units, whereby each of said driving units will bodily rotate about said control shaft and individually about its own axis when said disks rotate relative to each other, a second driving connection between one of said disks and said driven shaft, and means for rotating said control shaft and associated disk to thereby control the rate of rotation of said driven shaft.

7. In a power transmission unit the combination of a drive shaft, a driven shaft, and a control shaft, a gear rotatably mounted upon said control shaft, a plurality of second gears arranged in a circle upon said first gear, a third gear fixedly secured upon said control shaft, and being operatively connected to at least two of said second gears, a flexible driving connection between said drive shaft and said second gears, whereby each of said second gears will bodily rotate about said control shaft and individually about its own axis when said first gear rotates, a driving connection between said first gear and said driven shaft, and means for rotating said control shaft and associated first gear to thereby control the rate of rotation of said driven shaft.

MAURICE J. MORGAN.